United States Patent
Giro et al.

(10) Patent No.: US 12,508,550 B2
(45) Date of Patent: Dec. 30, 2025

(54) GENERATING AND VALIDATING OPTIMIZED MEMBRANES FOR CARBON DIOXIDE SEPARATION IN BINARY GAS

(71) Applicant: INTERNATIONAL BUSINESS MACHINES CORPORATION, Armonk, NY (US)

(72) Inventors: Ronaldo Giro, São Paulo (BR); Mathias B. Steiner, Rio de Janeiro (BR); Hsiang Han Hsu, Yokohama (JP); Akihiro Kishimoto, Tokyo (JP); Seiji Takeda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 17/401,279

(22) Filed: Aug. 12, 2021

(65) Prior Publication Data
US 2023/0046390 A1    Feb. 16, 2023

(51) Int. Cl.
  *G06N 20/00*    (2019.01)
  *B01D 53/22*    (2006.01)
  (Continued)

(52) U.S. Cl.
  CPC ............. *B01D 65/10* (2013.01); *B01D 53/22* (2013.01); *G06N 5/04* (2013.01); *G06N 20/00* (2019.01); *G06Q 30/0201* (2013.01)

(58) Field of Classification Search
  CPC ........ B01D 65/10; B01D 53/22; G06N 20/00; G06N 53/22; G06N 5/04; G06Q 30/0201
  (Continued)

(56) References Cited

U.S. PATENT DOCUMENTS 4,736,779 A * 4/1988 Bernauer .............. C01B 3/0005
                                                  48/190
10,366,779 B2   7/2019 Hsu et al.
(Continued)

FOREIGN PATENT DOCUMENTS

WO    WO-2021091883 A1 *  5/2021    ............. G06N 20/20

OTHER PUBLICATIONS

Machine Learning-Driven Discovery of Metal–Organic Frameworks for Efficient CO2 Capture in Humid Condition, Zhang et al, ACS Sustainable Chem. Eng. 2021, 9, 2872–2879, Feb. 5, 2021 (Year: 2021).*

(Continued)

*Primary Examiner* — Austin Hicks
(74) *Attorney, Agent, or Firm* — CHIP LAW GROUP

(57) ABSTRACT

A method and system of discovering materials for use in carbon dioxide separation includes extracting references to chemical molecules from online sources. The extracted references are encoded into chemical formulas. Molecular properties are calculated from the encoded chemical formulas. Features are extracted from the chemical formulas. Molecular properties of predicted molecular structures are predicted through a machine learning engine. The predicted molecular properties are based on the calculated molecular properties and extracted features. Target properties for predicted molecular structures are defined. Synthesized molecular structures are generated. The synthesized molecular structures include predicted molecular properties satisfying the defined target properties.

19 Claims, 14 Drawing Sheets

(51) Int. Cl.
*B01D 65/10* (2006.01)
*G06N 5/04* (2023.01)
*G06Q 30/0201* (2023.01)

(58) Field of Classification Search
USPC .......................................................... 706/12
See application file for complete search history.

(56) References Cited

U.S. PATENT DOCUMENTS

| 10,790,045 | B1 | 9/2020 | Goyal et al. | |
|---|---|---|---|---|
| 2005/0240355 | A1* | 10/2005 | Brown .................. | G16B 15/30 702/19 |
| 2010/0209307 | A1 | 8/2010 | Drabish et al. | |
| 2018/0012124 | A1 | 1/2018 | Hara et al. | |
| 2021/0110240 | A1 | 4/2021 | Hara et al. | |
| 2021/0287137 | A1* | 9/2021 | Park ....................... | G06N 20/00 |

OTHER PUBLICATIONS

Mell, P. et al., "Recommendations of the National Institute of Standards and Technology"; NIST Special Publication 800-145 (2011); 7 pgs.

Takeda, S. et al., "AI-driven Inverse Design System for Organic Molecules"; arXiv:2001.09038 (2021); 17 pgs.

Takeda, S. et al., "Molecular Inverse-Design Pla30rm for Material Industries"; arXiv:2004.11521v3 [cs.CE] (2020); 9 pgs.

Barnett, J. W. et al., "Designing Exceptional Gas-Separation Polymer Membranes using Machine Learning"; Sci. Adv. (2020); vol. 6; 7 pgs.

Higuchi C. et al., "Prediction of the Glass-Transition Temperatures of Linear Homo/Heteropolymers and Cross-Linked Epoxy Resins," ACS Applied Polymer Materials, May 10, 2019, vol. 1 Issue 6, 31 pages.

Kuenneth et al., Copolymer Informatics with Multitask Deep Neural Networks, Macromolecules, Jun. 29, 2021, vol. 54, Issue 13, 11 pages.

Pilania G. et al., "Machine-Learning-Based Predictive Modeling of Glass Transition Temperatures: A Case of Polyhydroxyalkanoate Homopolymers and Copolymers," Journal of Chemical Information and Modeling, Nov. 7, 2019, vol. 59, Issue 12, 44 pages.

Tao et al., Machine Learning Discovery of High-Temperature Polymers, Patterns, Apr. 9, 2021, vol. 2, Issue 4, 16 pages.

Jozef Bicerano, "Prediction of Polymer Properties", https://www.taylorfrancis.com/books/mono/10.1201/9780203910115/prediction-polymer-properties-jozef-bicerano, 2002, 116 pages.

* cited by examiner

GENERATING AND VALIDATING OPTIMIZED MEMBRANES FOR CARBON DIOXIDE SEPARATION IN BINARY GAS

BACKGROUND

Technical Field

The present disclosure generally relates to data processing, and more particularly, to systems and methods of generating and validating optimized membranes for carbon dioxide separation in binary gas.

Description of the Related Art

The generation of optimized molecules in the field of materials discovery has yet to leverage the computing resources of today's technology. Current computational discovery approaches either lack the methods for automated creation of training data that are salient to design optimized molecules. Or, they lack the methods for automated validation of the physical performance of discovered molecules in a material's target application.

For a long time, the development of new materials was based on a trial-and-error approach. This procedure basically was based on looking for existing materials with properties similar to the target properties and then modifying the existing material or combining different materials to achieve this goal. This approach was dependent on the specialist's knowledge and experimental tests. The approach is very costly and time consuming making overall material development around 20 years to achieve.

With the increase in available computational power and the development of new computer simulation techniques that demand fewer resources (e.g., Density Functional Theory (DFT)), this approach has changed. A new approach has emerged based on high throughput computational materials screening/design (HCMSD) method. Although, at first glance, it appears very similar to the previous one, due to the computational automation, the HCMSD method speeds up the process. There are many successful examples of application of this approach available. The main problem of the HCMSD method is that it relies on ab-initio calculations, which is computational costly, thereby limiting the applicability of the method.

As can be seen, there remains a challenge in finding a way to better explain how a deep learning model operates to refine and improve its training.

SUMMARY

According to an embodiment of the present disclosure, a computer implemented method of discovering materials for use in carbon dioxide separation is disclosed. The method includes extracting references to chemical molecules from sources. The extracted references are encoded into one or more chemical formulas. Molecular properties are calculated from the encoded chemical formulas. Features are extracted from the chemical formulas. Molecular properties of predicted molecular structures are predicted through a machine learning engine. The predicted molecular properties are based on the calculated molecular properties or from literature data and extracted features. One or more target properties for predicted molecular structures are defined. New molecular structures are generated. The new molecular structures include predicted molecular properties satisfying the defined target properties.

In one embodiment of the method, the defined target properties may include a gas permeability and selectivity, a glass transition temperature and temperature of half decomposition for a candidate synthesized molecule. As will be appreciated, the defined target properties may be particularly useful in discovering membranes for carbon dioxide separation. Other prior art properties may be too general and not necessarily helpful in the context of carbon dioxide separation.

According to another embodiment of the present disclosure, a computer program product for discovering materials for use in carbon dioxide separation is provided. The computer program product includes one or more computer readable storage media, and program instructions collectively stored on the one or more computer readable storage media. The program instructions include extracting references to chemical molecules from sources. The extracted references are encoded into one or more chemical formulas. Molecular properties are calculated from the encoded chemical formulas. Features are extracted from the chemical formulas. Molecular properties of predicted molecular structures are predicted through a machine learning engine. The predicted molecular properties are based on the calculated molecular properties or from literature data and extracted features. Target properties for predicted molecular structures are defined. New molecular structures are generated. The new molecular structures include predicted molecular properties satisfying the defined target properties.

According to one embodiment, encoding may include converting the references to chemical molecules into simplified molecular-input line-entry system (SMILES) string representations. SMILES representations include topological features and are easier to digest by computer processes. By encoding references to chemical molecules in SMILES formats, the subject technology benefits by efficiently extracting chemical and topological features and substantially reducing the computational cost for machine learning predictions. The format may recognize different variations of a reference to a chemical. The different variations are translated into a single universal representation which a machine will have an easier time recognizing.

According to another embodiment of the present disclosure, a computer server is disclosed. The computer server includes: a network connection; one or more computer readable storage media; a processor coupled to the network connection and coupled to the one or more computer readable storage media; and a computer program product including: program instructions collectively stored on the one or more computer readable storage media, the program instructions include extracting references to chemical molecules from sources. The extracted references are encoded into one or more chemical formulas. Molecular properties are calculated from the encoded chemical formulas. Features are extracted from the chemical formulas. Molecular properties of predicted molecular structures are predicted through a machine learning engine. The predicted molecular properties are based on the calculated molecular properties and extracted features. Target properties for predicted molecular structures are defined. New molecular structures are generated. The new molecular structures include predicted molecular properties satisfying the defined target properties.

According to one embodiment, the program instructions may also include applying a rules based filtering criteria to the generated new molecular structures. The generated new molecular structures are compared to the filtering criteria. One of the generated new molecular structures is identified as a best match to the filtering criteria. The identified generated new molecular structure is validated for usability in carbon dioxide separation. By filtering out candidate structures according to best matching structures, the server will be able to locate the best performing new molecules more efficiently.

Moreover, and in general to the embodiments disclosed above, it will be appreciated that features of machine learning are being applied to the context of materials discovery for improvement in discovering new molecules for carbon dioxide separation. To date, aspects of the subject technology are an improvement over previous materials discovery approaches because the location of potential new structures becomes available by automatically extracting potential chemical structures from online resources, learning what structures provide certain functional properties, defining target properties, and then allowing the subject technology to automatically synthesize new structures that may satisfy those properties. This is an improvement over the previous trial and error human based approaches.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIGS. 2A-2F are example screenshots of user interfaces of an artificial intelligence module for a process generating and validating simulated optimized membranes for carbon dioxide separation in binary gas, according to illustrative embodiments.

DETAILED DESCRIPTION

Overview

Figure 1:
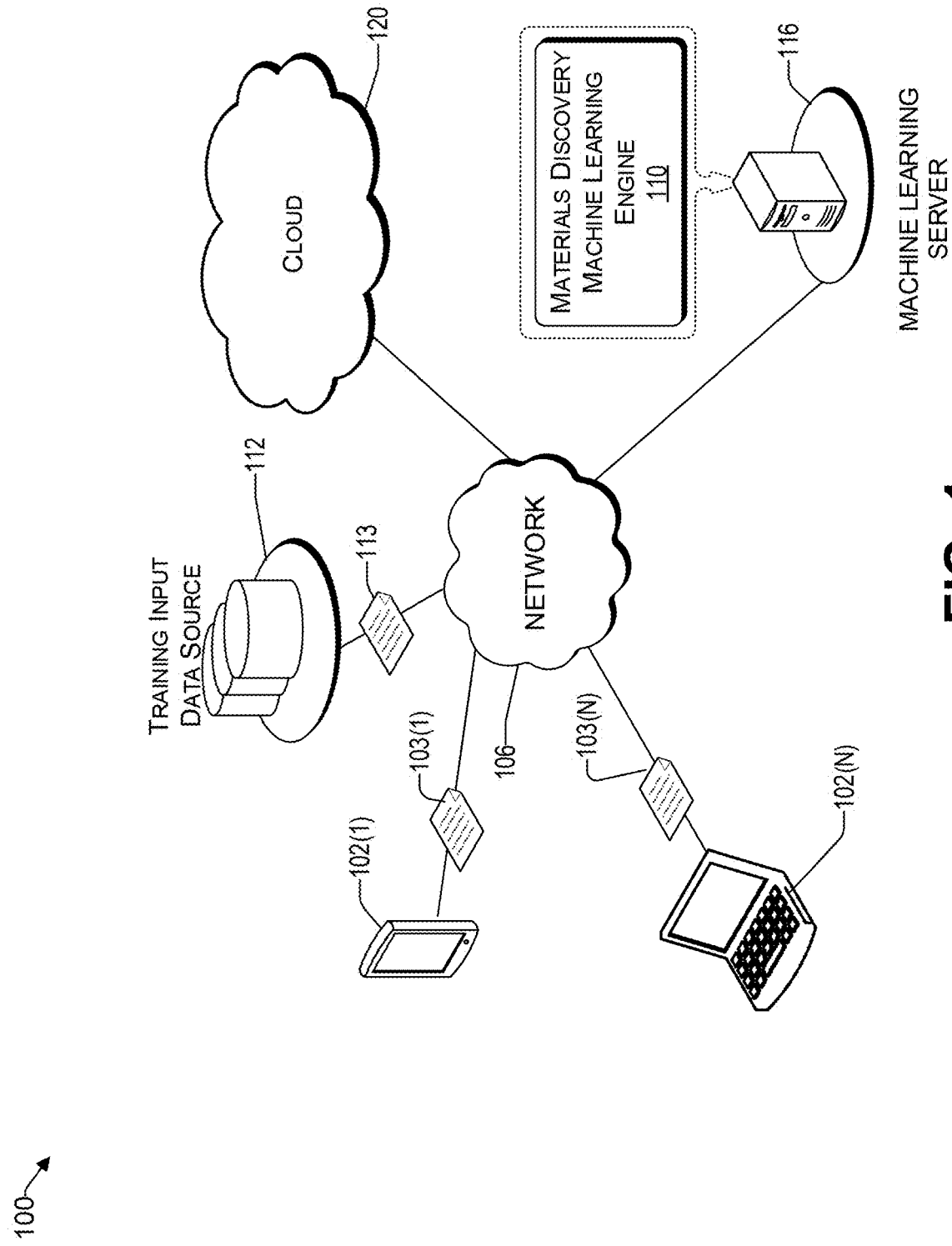
FIG. 1 is a block diagram of an architecture for materials discovery through machine learning, according to an embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods of training an interpretable deep learning model of data. As will be appreciated, aspects of the subject disclosure improve on the interpretability of data from a deep learning model. Generally, the embodiments may be practiced in the field of machine learning applications.

In the subject disclosure that follows, embodiments disclose a computational framework for automated, end-to-end materials discovery and its first application to polymer membranes for gas filtration is disclosed. In general, artificial intelligence (A.I.) is used to discover new materials.

Embodiments describe automated discovery steps, from training data and feature vector creation via generative modeling of monomers to molecular dynamics simulation of polymer membrane filtration. To quantify the discovery advantage, the carbon dioxide permeability of polymer membranes obtained with newly discovered monomers is benchmarked against known reference materials. The inclusion of additional target properties in the material discovery workflow along with generative modeling of larger molecular entities will improve the discovery outcome and benefit the broader applicability of the discovery system.

As will be appreciated, A.I. based materials designs show an advantage over the HCMSD method. In one aspect, A.I. based designs do not rely on costly ab-initio calculations to predict materials property. In some embodiments, the Inverse Materials Design (IMD) method may be used. The idea behind the IMD method is that given a vector with a set of materials target properties, a set of new materials are proposed using an A.I. automated based approach. An exemplary embodiment uses the IMD method applied in the design of polymeric membranes for binary gas mixture separation. It should be appreciated that the use of A.I. and features of the IMD method are non-conventional in the field of materials discovery, and for at least to the discovery of optimized molecule discovery for carbon dioxide separation in binary gas. As discussed above, the conventional approach is based on manual trial and error. Aspects of the subject technology process an indefinite number of permutation combinations that would require more manpower and man hours than would be realistically possible within a reasonable amount of time.

In the subject disclosure, an end-to-end fully automated in silico process workflow for the first application of the IMD method for the design of homopolymers for binary gas mixtures separation membranes will be shown. Embodiments use a computational materials discovery engine, based on machine learning and optimization algorithms. In the context of small organic molecules that typically qualify as candidate building blocks for polymer membranes, monomer units are often treated as graphs and can be converted to computer readable SMILES format. To that end, a graph-based methodology with high domain specific interpretability may be applied.

Example Architecture

FIG. 1 illustrates an example architecture 100 for interpretable deep learning of data. Architecture 100 includes a network 106 that allows various computing devices 102(1) to 102(N) to communicate with each other, as well as other elements that are connected to the network 106, such as a training data input source 112, a machine learning server 116, and the cloud 120.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows the machine learning engine 110, which is a software program running on the machine learning server 116, to communicate with a training data input source 112, computing devices 102(1) to 102(N), and the cloud 120, to provide data processing. The training data input source 112 may provide data that will be processed under one or more techniques described here. The data processing may be one or more user specified tasks including for example, polymer property calculation. The data input into the training data input source 112 may be for example, polymer membrane chemical structures. In one embodiment, the data processing is performed at least in part on the cloud 120.

For purposes of later discussion, several user devices appear in the drawing, to represent some examples of the computing devices that may be the source of data being analyzed depending on the task chosen. Aspects of the symbolic sequence data (e.g., 103(1) and 103(N)) may be communicated over the network 106 with the machine learning engine 110 of the machine learning server 116. Today, user devices typically take the form of portable handsets, smart-phones, tablet computers, personal digital assistants (PDAs), and smart watches, although they may be implemented in other form factors, including consumer, and business electronic devices.

For example, a computing device (e.g., 102(N)) may send a request 103(N) to the machine learning engine 110 to identify features present in the input data stored in the computing device 102(N).

While the training data input source 112 and the machine learning engine 110 are illustrated by way of example to be on different platforms, it will be understood that in various embodiments, the training data input source 112 and the machine learning server 116 may be combined. In other embodiments, these computing platforms may be implemented by virtual computing devices in the form of virtual machines or software containers that are hosted in a cloud 120, thereby providing an elastic architecture for processing and storage.

Example Methodology

Figure 2:
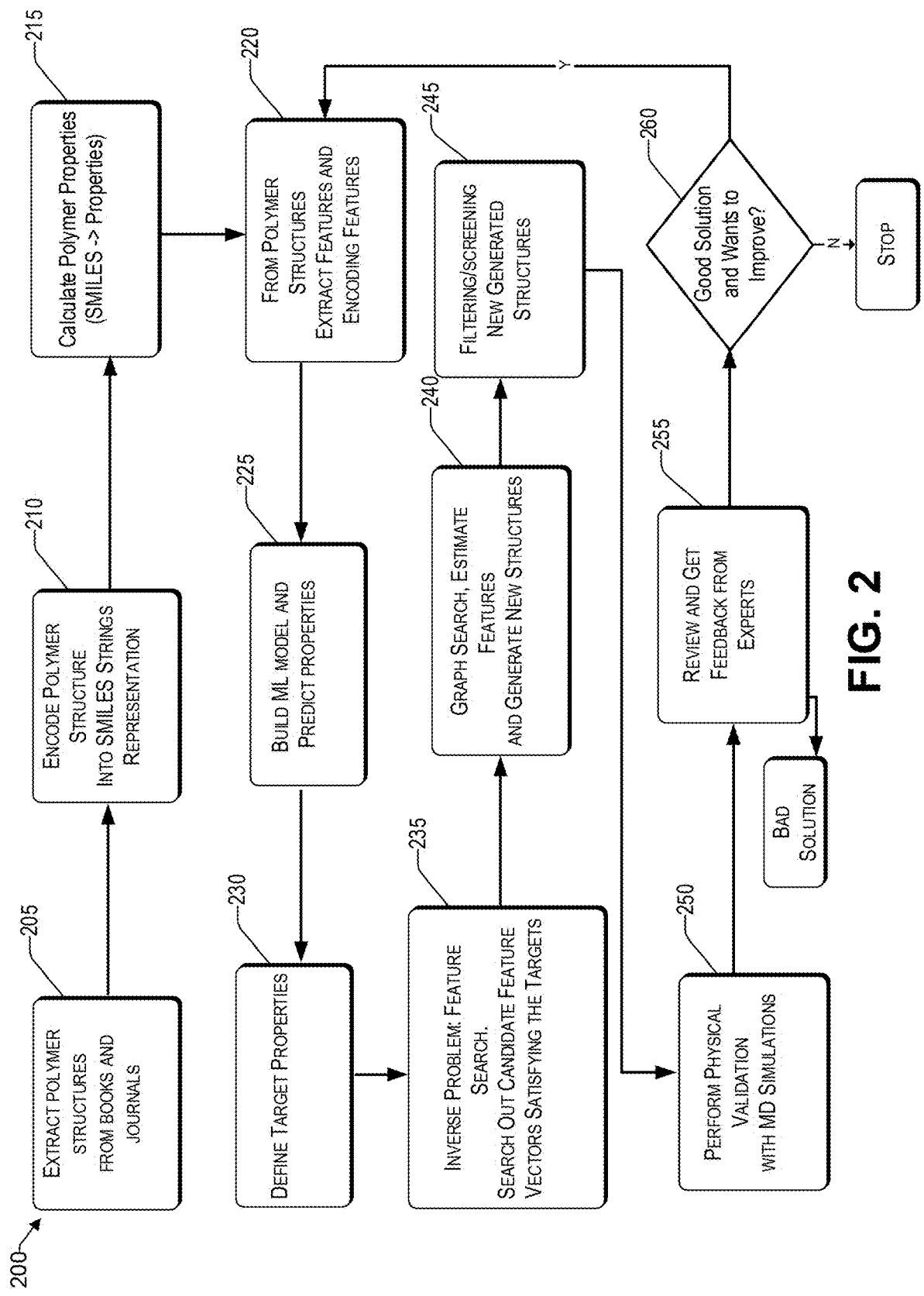
FIG. 2 is a flowchart of a method for generating and validating simulated optimized membranes for carbon dioxide separation in binary gas, according to an embodiment.

Referring now to FIG. 2, a method 200 for generating and validating simulated optimized membranes for carbon dioxide separation in binary gas is shown according to an embodiment. As will be understood, the method 200 is generally a computer implemented process and the steps that follow may be automated based on a script programmed into the computing device(s) performing the method.

Figure 3:
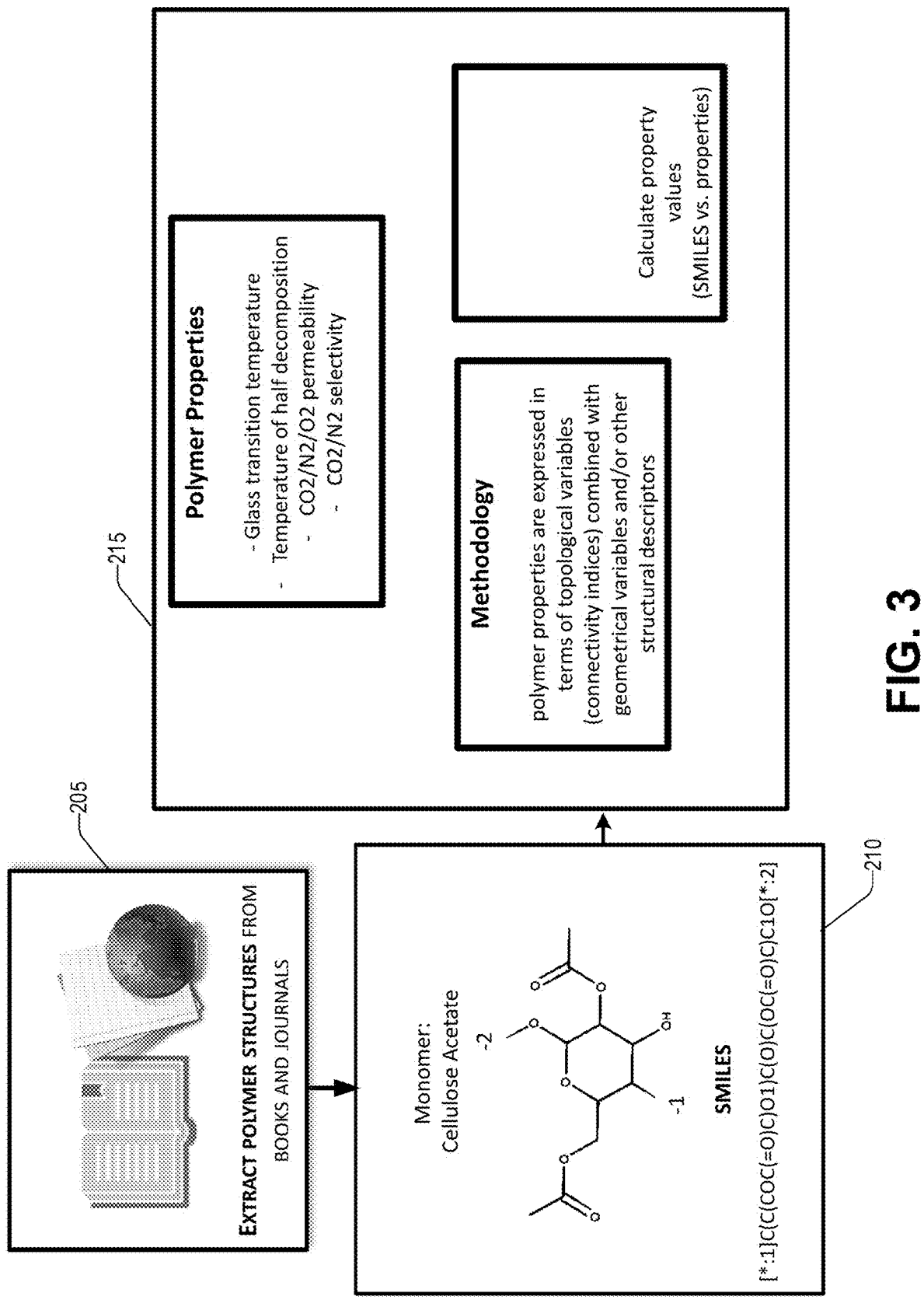
FIG. 3 is a flowchart of a method for determining polymer properties, according to an embodiment.

The method 200 may begin with preliminary setup steps as described in blocks 205, 210, and 215. FIG. 3 shows an expanded view of blocks 205, 210, and 215 with some illustrative examples. The method extracts 205 polymer structures from sources containing such structures. Examples of sources may be scientific literature (books and journals) that may be available online. Recognition of polymer structures in the sources may be performed by techniques including, for example, keyword searches and optical character recognition. The extracted polymer structures may be encoded 210 into simplified molecular-input line-entry system (SMILES) string representations. FIG. 3 shows for example, the SMILES string representation for cellulose acetate as if it were extracted from a source for purposes of locating a new optimized membrane for carbon dioxide separation.

Figure 2A:
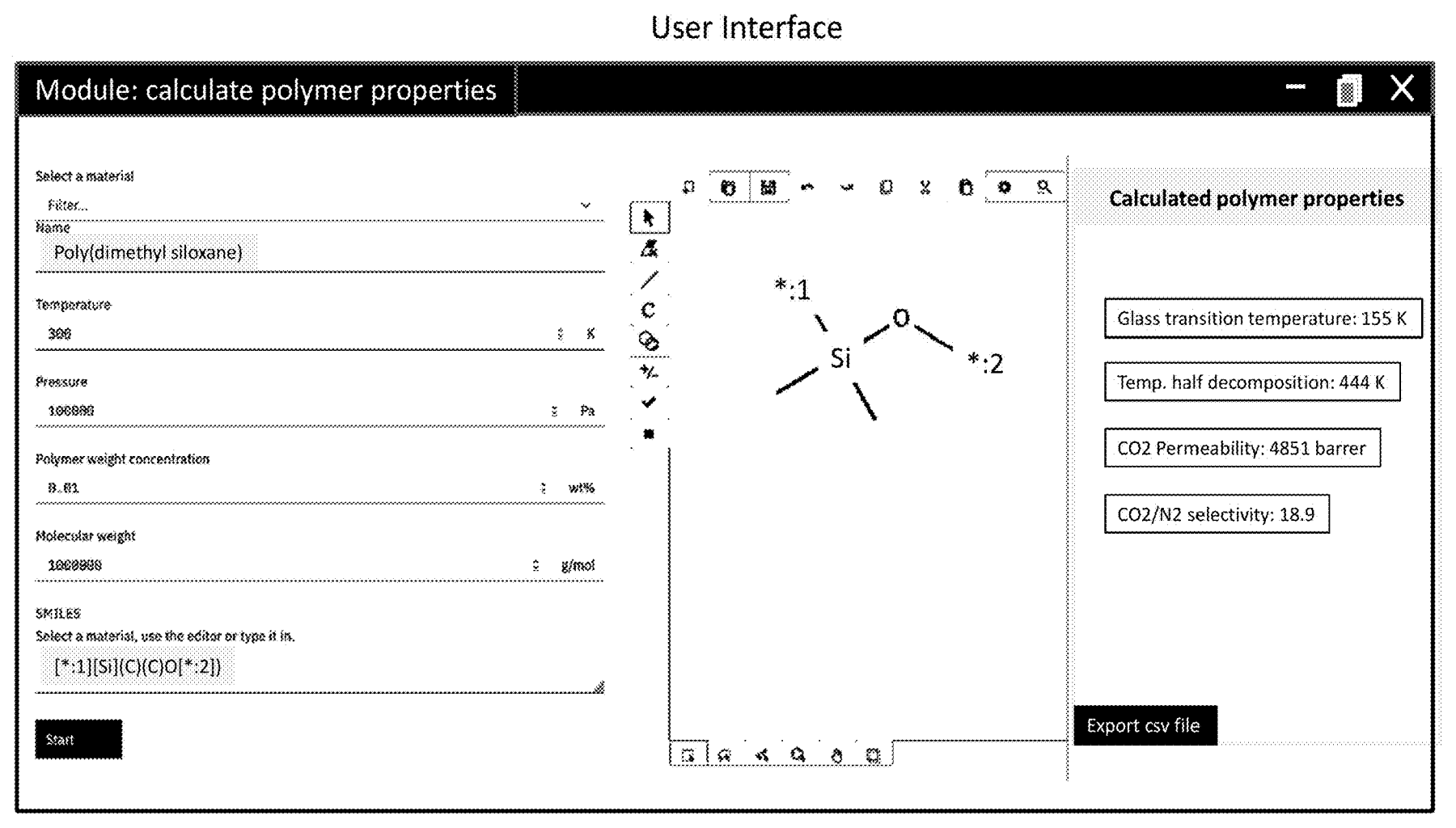

Referring temporarily to FIG. 2A, a user interface is shown according to an embodiment. A user may, in some embodiments, select a polymer structure from among the extracted polymers for direct study. As shown in the UI of FIG. 2A, a polymer may be selected automatically or my manual entry of its SMILES string. Polymer properties for the extracted polymers are calculated 215 based on the SMILES coding information for the polymers. In an exemplary embodiment, the polymer properties may be expressed in terms of topological variables combined with geometric variables, and/or other descriptors. Calculated polymer properties allow the process to obtain all the important properties for each homopolymer without sparsity or lack of information, for example, $CO_2$ and $N_2$ permeabilities, glass transition temperature, and temperature associated with the half-life of the polymer. The half-life temperature is the temperature at which the loss of weight during pyrolysis (at a constant rate of temperature rise) reaches 50% of its final value. This characteristic captures the stability of the polymer under harsh operational conditions.

Features from the polymers may be extracted 220 and encoded for the polymer structures. Using the extracted/encoded features, a machine learning model may be built to predict 225 properties from the polymer structures. Target properties of optimal membrane structures for carbon dioxide separation are defined 230. In an exemplary embodiment, target properties may include for example, gas permeability and selectivity, glass transition temperature and temperature of half decomposition. The last two properties are related with thermal and physical/chemical stability.

Figure 2B:
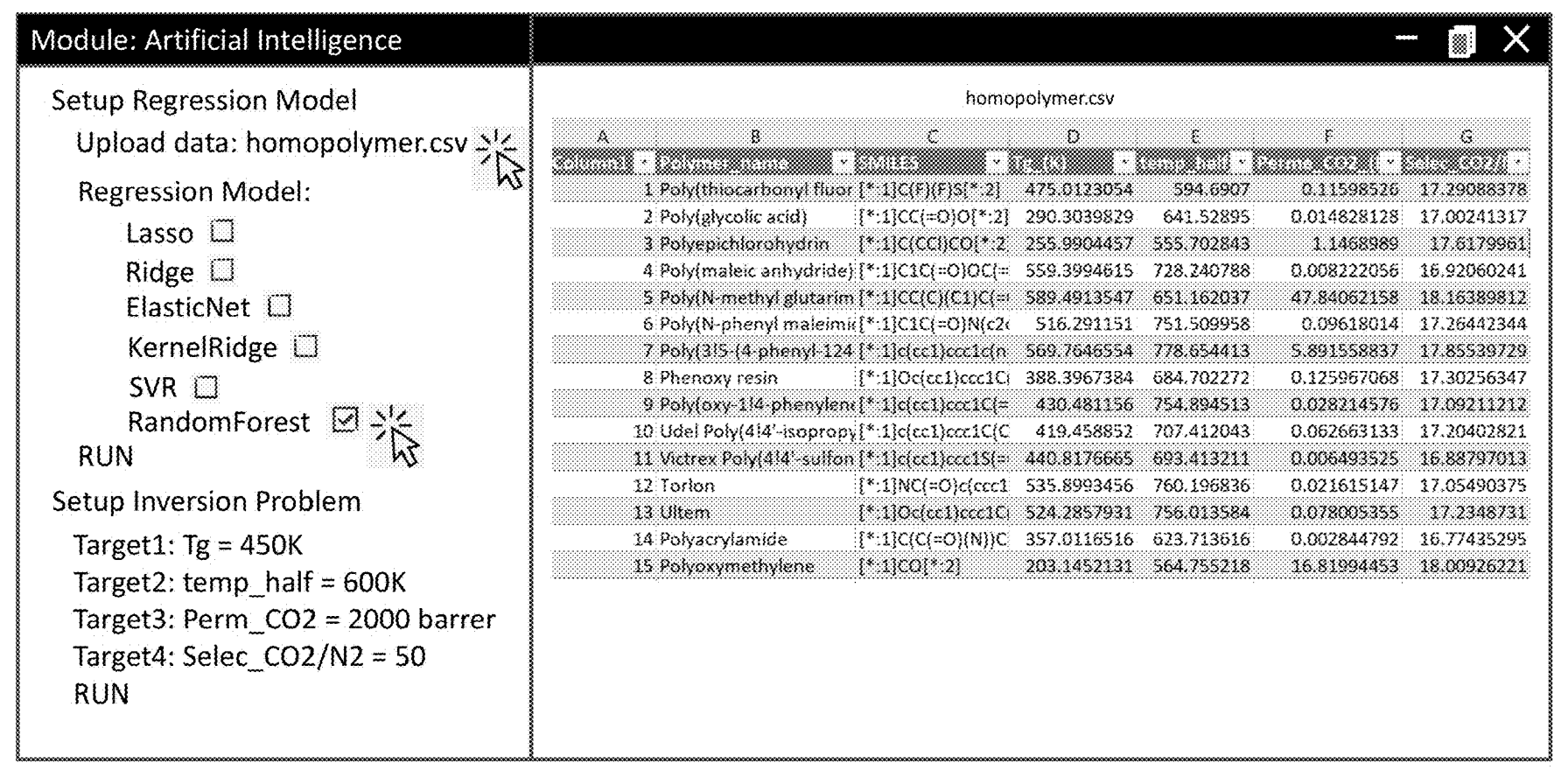

In an exemplary embodiment, the machine learning model may be configured to learn through an inverse problem feature search. The model may be configured to search 235 out candidate feature vectors satisfying the target properties. FIG. 2B shows a UI module configured for users to setup regression models and inversion problems. The method may graph search, estimate features, and generate 240 new membrane structures from the polymer data fed to the model.

Based on graph theory and atom configurations, there exist various types of feature vectors, such as: number of heavy atoms, number of rings, substructures, fingerprints, Coulomb matrix, dipole moment, potential energy, and experimental conditions, which can be combined for application of machine learning models. The feature extraction is applicable to monomer units of both homo-polymers and co-polymers. For molecular property prediction, the subject technology may train and cross validate regression models with respect to specific target properties and multiple sets of feature vectors. The method may optimize the hyper-parameters of the regression models with an exhaustive grid search and may use single-property prediction models with the highest property-specific cross validation scores for improved structure generation. In some embodiments, the structure generation may be performed by using a canonical construction path algorithm.

By using Equation 1, the method may estimate feature vector values fv based on a target property value vp and a regression model fp by minimizing the score of each feature vector v. More specifically, the minimization is performed over the square error of the estimated value which is normalized by the prediction variance $\sigma^2_p$ to which a penalty function is added to account for violations of structural constraints:

$$fv = \mathrm{argmin}\left\{\frac{|vp - fp(v)|^2}{\sigma^2_p} + \mathrm{violation}\ (v)\right\} \quad \text{(Eq. 1)}$$

For improving the quality of generated molecular structures and to account for human input, the subject method may include customized constraint functions. Constraint functions capture design rules such as, for example, disallowing triple bonds between carbon atoms, limiting the number of molecular rings in the structure to between 4 and 9, or including preferential molecular substructures. All constraints may be merged with the extracted feature vectors and best regression models for subsequent iterations of optimized structure generation.

Figure 2C:

FIG. 2C displays an example list of generated new structures as a result of the above input parameters.

Figure 2D:
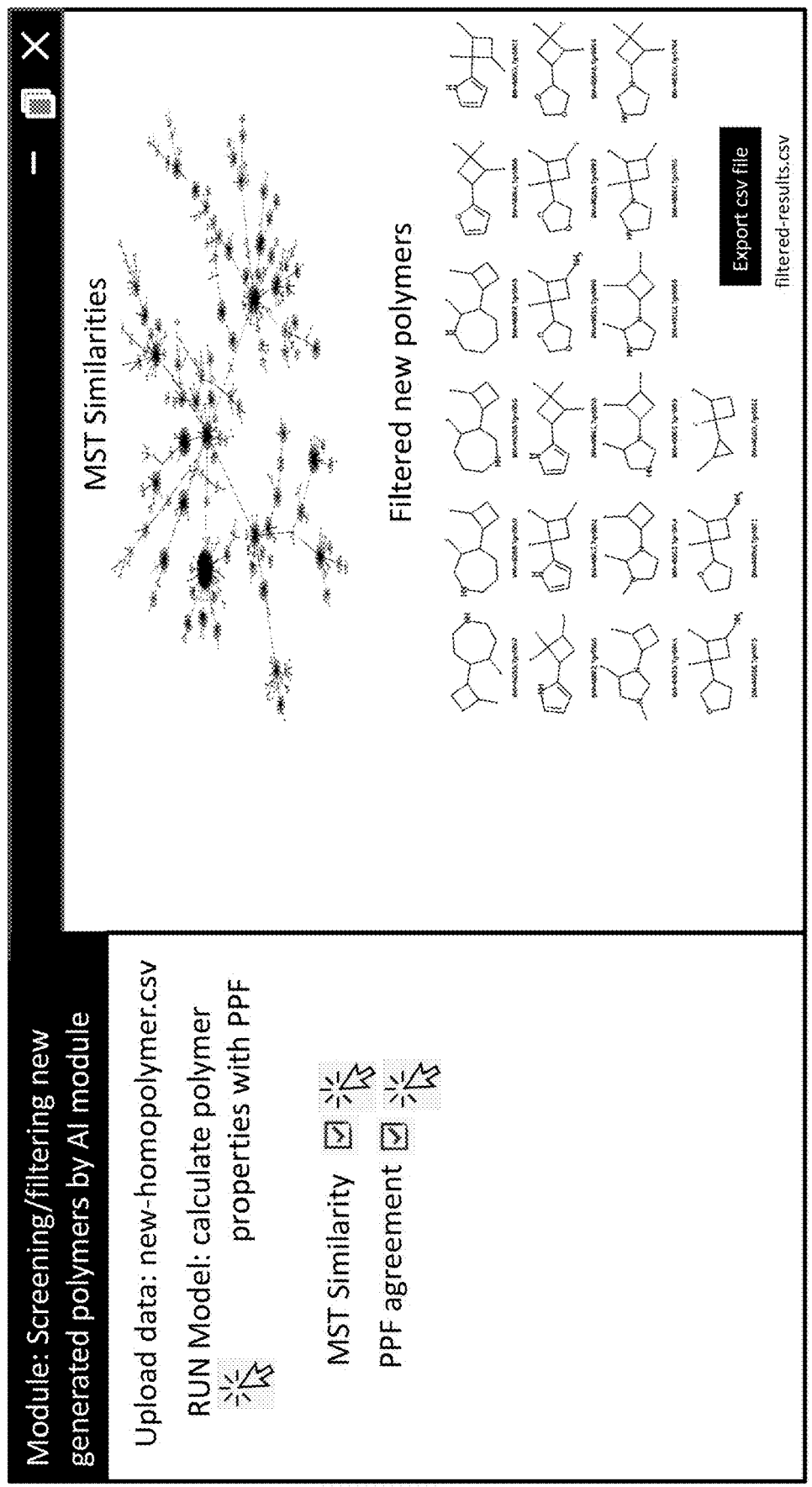

In one embodiment, new membrane structures may be filtered/screened 245. An example screening process is shown in more detail in FIG. 4 below. FIG. 2D shows another A.I. module UI displaying candidate polymers as a result of screening techniques of the subject technology.

Figure 2E:
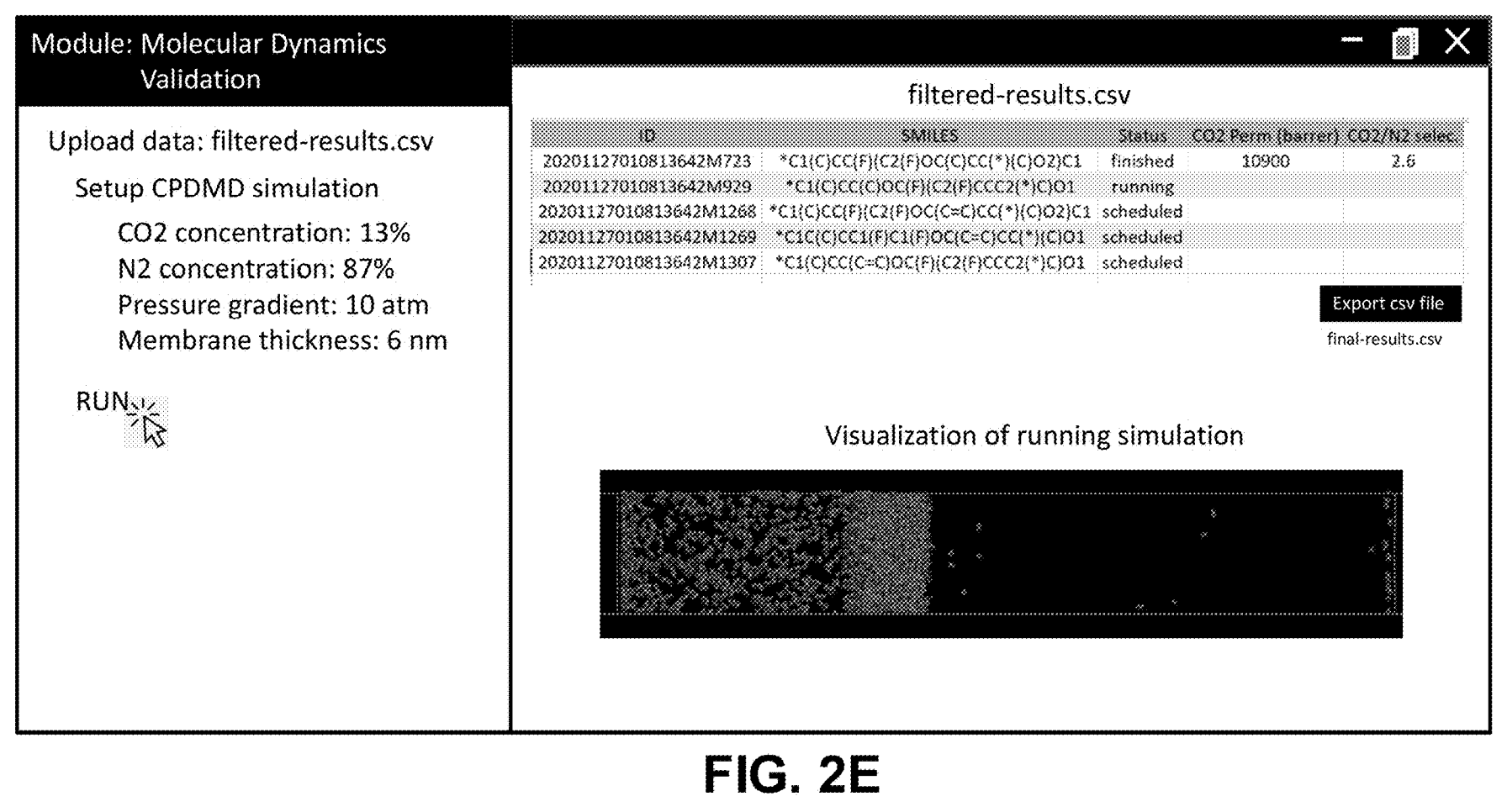
Figure 2F:

The candidate generated polymeric membranes are validated 250 through physical molecular dynamics modelling simulations under operational conditions: with a specific concentration of two gases (e.g., $CO_2/N_2$), temperature, pressure gradient and pressure in the feed and permeate chamber. FIG. 2E shows an example UI displaying a visual simulation of a candidate polymer being validated. One candidate polymer validation has finished, while one candidate is currently being validated and other candidates are waiting for validation. Candidate membranes that are validated may be screened manually 255 by experts. Candidate membranes that are found to be bad solutions may be rejected. Examples of bad solutions are: (i) new molecules where the $CO_2$ permeability and $CO_2/N_2$ selectivity obtained from molecular dynamics simulations do not match with the A.I. predicted values, and (ii) new molecules that are difficult to synthesize (from a chemist's perspective). Acceptable membrane candidates may be accepted and, in some embodiments, may be fed 260 back to the model for improvement. FIG. 2F shows an example UI after validation of a candidate polymer. Some embodiments may display a structural formula of a candidate polymer. The UI may include selectable functions for a user to accept the candidate polymer, use the candidate polymer to further improve the machine learning model, reject the candidate polymer, and re-run the inversion problem.

Figure 4:
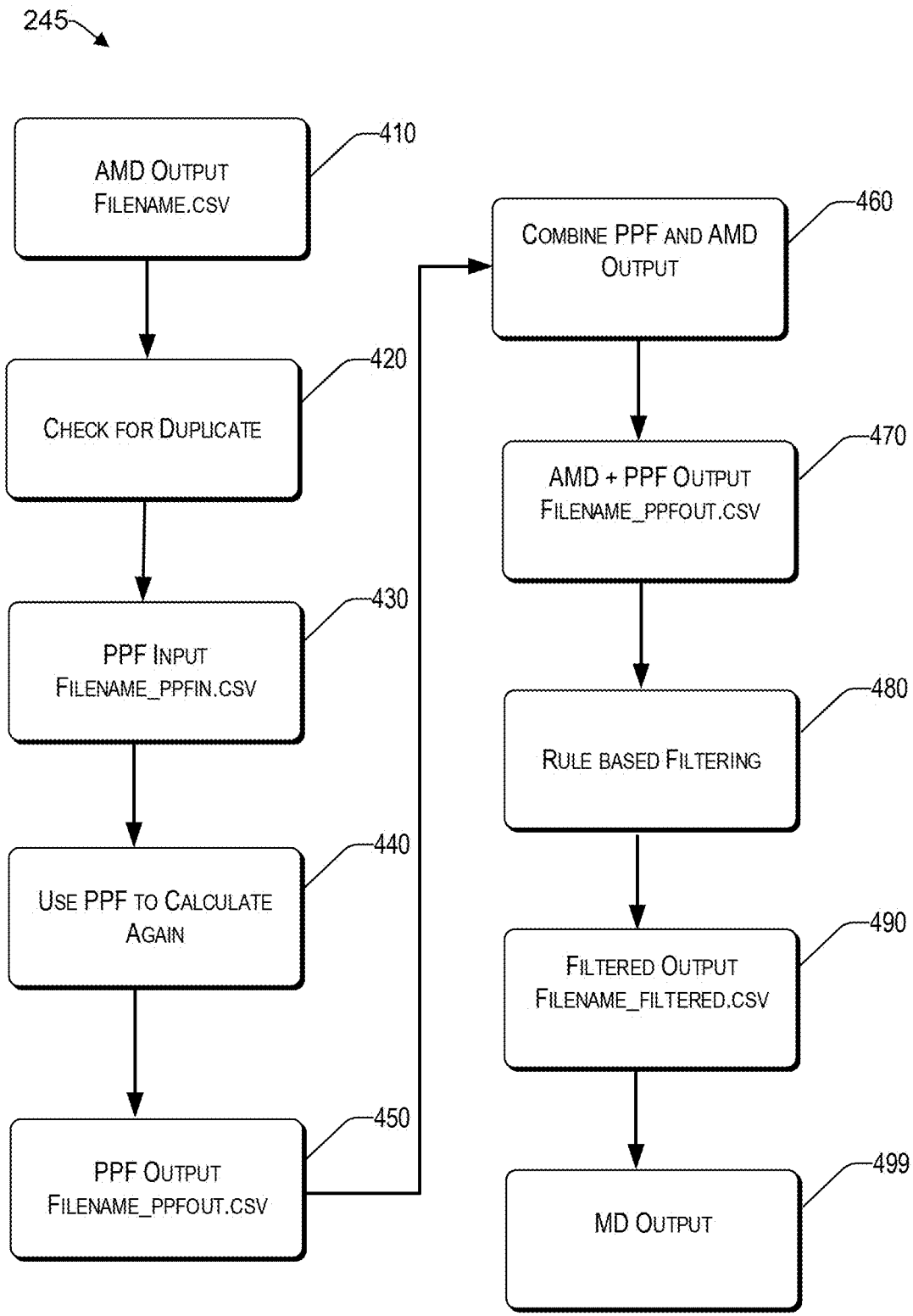
FIG. 4 is a flowchart of a method for screening new generated structures, according to some embodiments.

FIG. 4 shows an expansion of the filtering/screening process of block 245 according to an exemplary embodiment. In block 410 an accelerated materials discovery (AMD) output is received, which is, for example, new molecules predicted by the process described above in FIG. 2. In block 420, there is a check for duplicate proposed molecular structures. In block 430, the polymer property functionality (PPF) (for example, the properties from block 215) of a molecule may be received and used to calculate the polymer properties for selecting optimal candidate structures in block 440. The output of the PPF value(s) are provided in block 450. The PPF output and the AMD molecule data are provided in block 460 and may be compared to each other in block 470. Rule based filtering may be applied to the PPF values and the AMD molecules in block 480. If there is a match, for example, one of the AMD molecules matches (or is the best match for) the PPF values for an optimized membrane structure for a specified application, the matching molecule may be filtered out in block 490 from the other AMD molecules and is screened out and forwarded for molecular dynamics validation in block 499, details of which can be seen in the following disclosure of FIG. 5.

Figure 5:
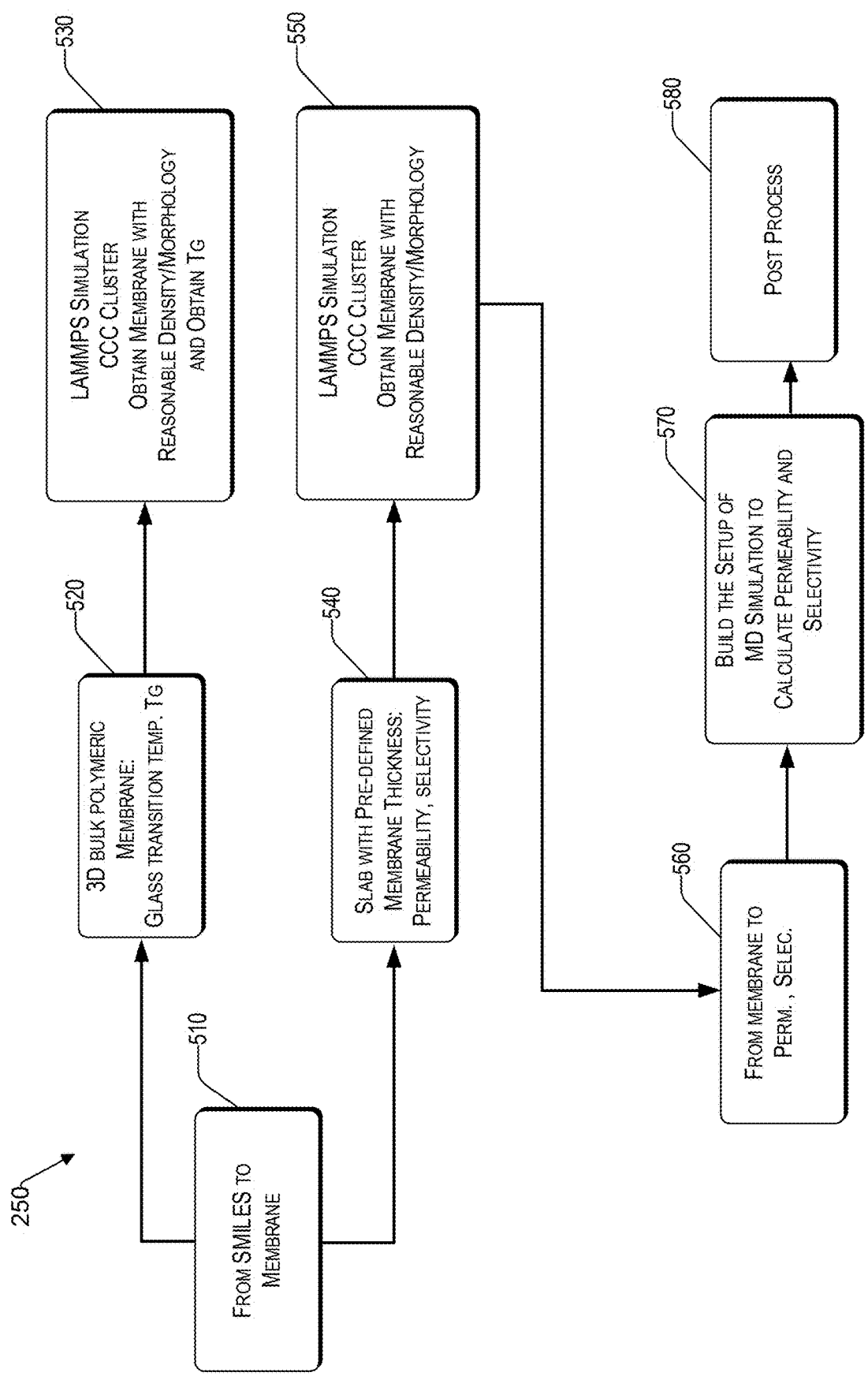
FIG. 5 is a flowchart of a method for physical simulation validation, according to some embodiments.

FIG. 5 shows a method 500 for physical simulation validation of generated molecular membranes according to an exemplary embodiment. In block 510, a selected generated molecule that is being validated may be presented as a SMILES string and may be converted into a polymeric membrane. The SMILES string is converted into a polymer monomer with the respective atom species and coordinates. Then a polymer chain is built by attaching the monomers sequentially. After that, these chains are packaged into a three-dimensional box. Then an equilibration process starts. Molecular dynamics simulations are performed to obtain a polymeric membrane with representative morphology and density. After block 510, the process may bifurcate along paths that may have concurrently completed steps.

In block 520, the materials discovery engine builds a three-dimensional bulk polymeric membrane to calculate the glass transition temperature Tg. In block 530, the three-dimensional bulk polymeric membrane may be evaluated under a Large-scale Atomic/Molecular Massively Parallel Simulator (LAMMPS) process to obtain a membrane with a reasonable density/morphology and their glass transition temperature (Tg).

In block 540, a slab with pre-defined membrane thickness is built to calculate permeability and selectivity of the molecule. In block 550, the slab with pre-defined membrane thickness may be evaluated under a LAMMPS process to obtain a membrane with a reasonable density/morphology.

In block 560, the results from the LAMMPS simulation on the slab is provided and use in the molecular dynamics simulation of block 570 to determine permeability and selectivity. Block 580 represents post-process of the validation results generated.

Example Computer Platform

Figure 6:
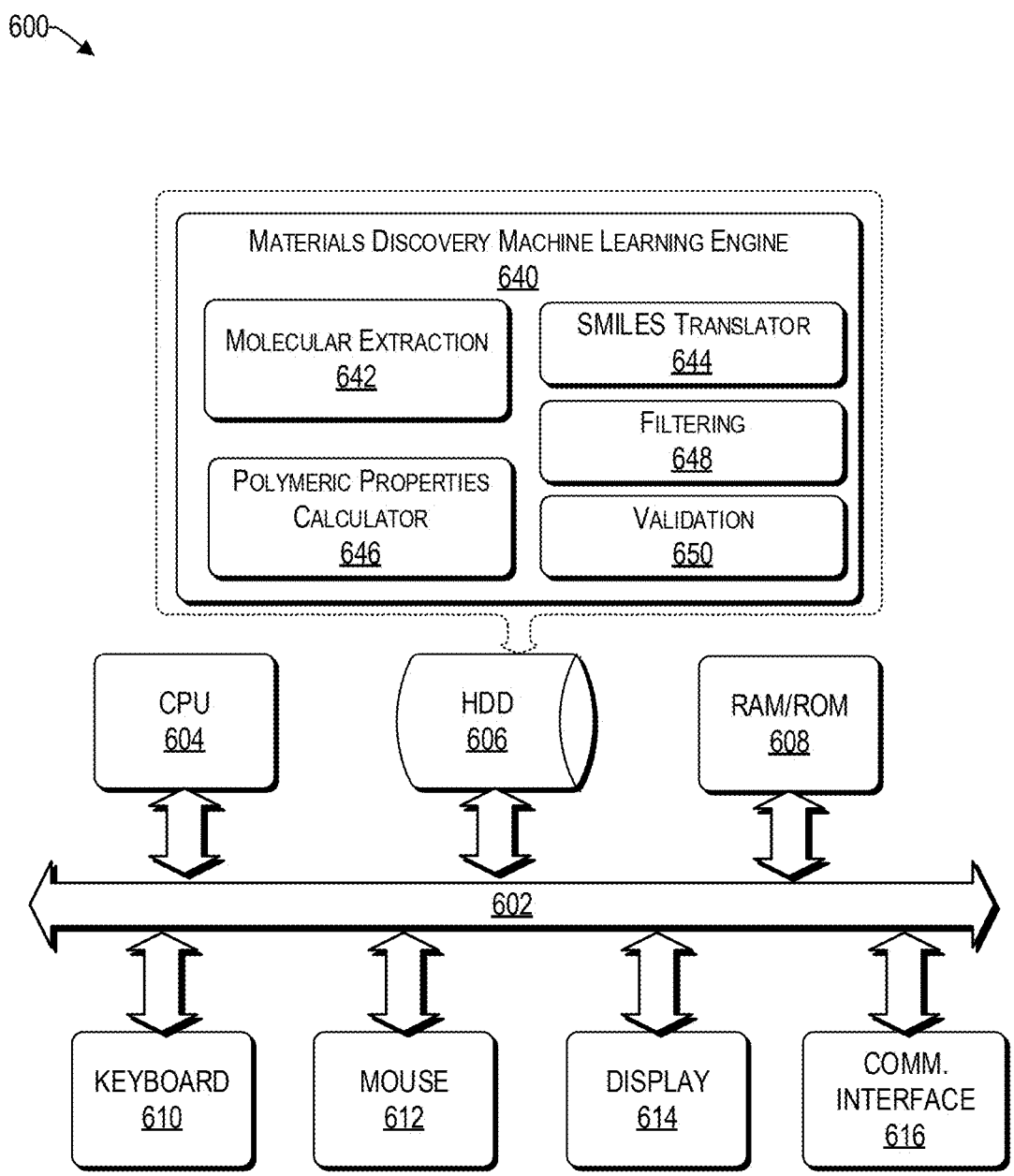
FIG. 6 is a functional block diagram illustration of a particularly configured computer hardware platform that can communicate with various networked components, consistent with an illustrative embodiment.

As discussed above, functions relating to interpretable modeling of the subject disclosure can be performed with the use of one or more computing devices connected for data communication via wireless or wired communication, as shown in FIG. 1. FIG. 6 is a functional block diagram illustration of a particularly configured computer hardware platform that can communicate with various networked components, such as a training input data source, the cloud, etc. In particular, FIG. 6 illustrates a network or host computer platform 600, as may be used to implement a server, such as the machine learning server 116 of FIG. 1.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602.

In one embodiment, the HDD 606, has capabilities that include storing a program that can execute various processes, such as the materials discovery machine learning engine 640, in a manner described herein. Generally, the machine learning engine 640 may be configured to operate an artificial intelligence based process for discovering new molecular material structures under the embodiments described above. The machine learning engine 640 may have various modules configured to perform different functions.

For example, the machine learning engine 640 may include a molecular extraction module 642 that is operative to identify and pull references to molecules from online sources.

In some embodiments, the machine learning engine 640 may include a SMILES translator module 644 configured to translate written versions, audio versions and chemical formula versions of molecular references from sources into SMILES string representations.

In some embodiments, the machine learning engine 640 may include a polymeric properties calculator 646 configured to determine polymer properties and values from extracted chemical references.

In some embodiments, the machine learning engine 640 may include a filtering module 648 configured to screen out machine learned new molecules for molecules that meet application specific properties from those molecules that are bad solutions or insufficient to meet the application requirements.

In some embodiments, the machine learning engine 640 may include a validation module 650 configured to validate machine learned candidate molecules for their usability in an application specific task.

Example Cloud Platform

As discussed above, functions relating to data processing using a machine learning model to discover new materials for application specific tasks (for example carbon dioxide separation), may include a cloud computing environment 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
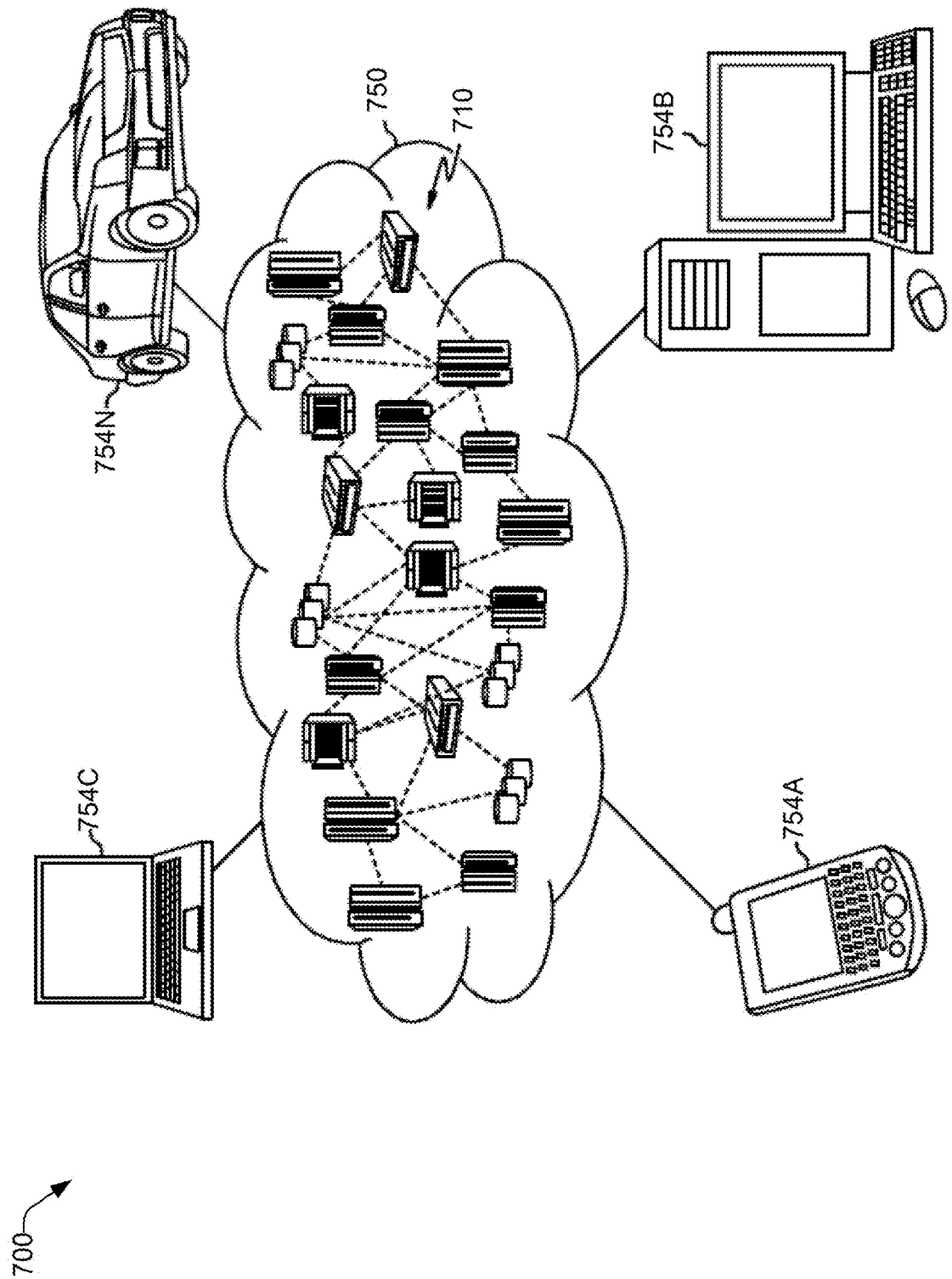
FIG. 7 depicts a cloud computing environment, consistent with an illustrative embodiment.

Referring now to FIG. 7, an illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
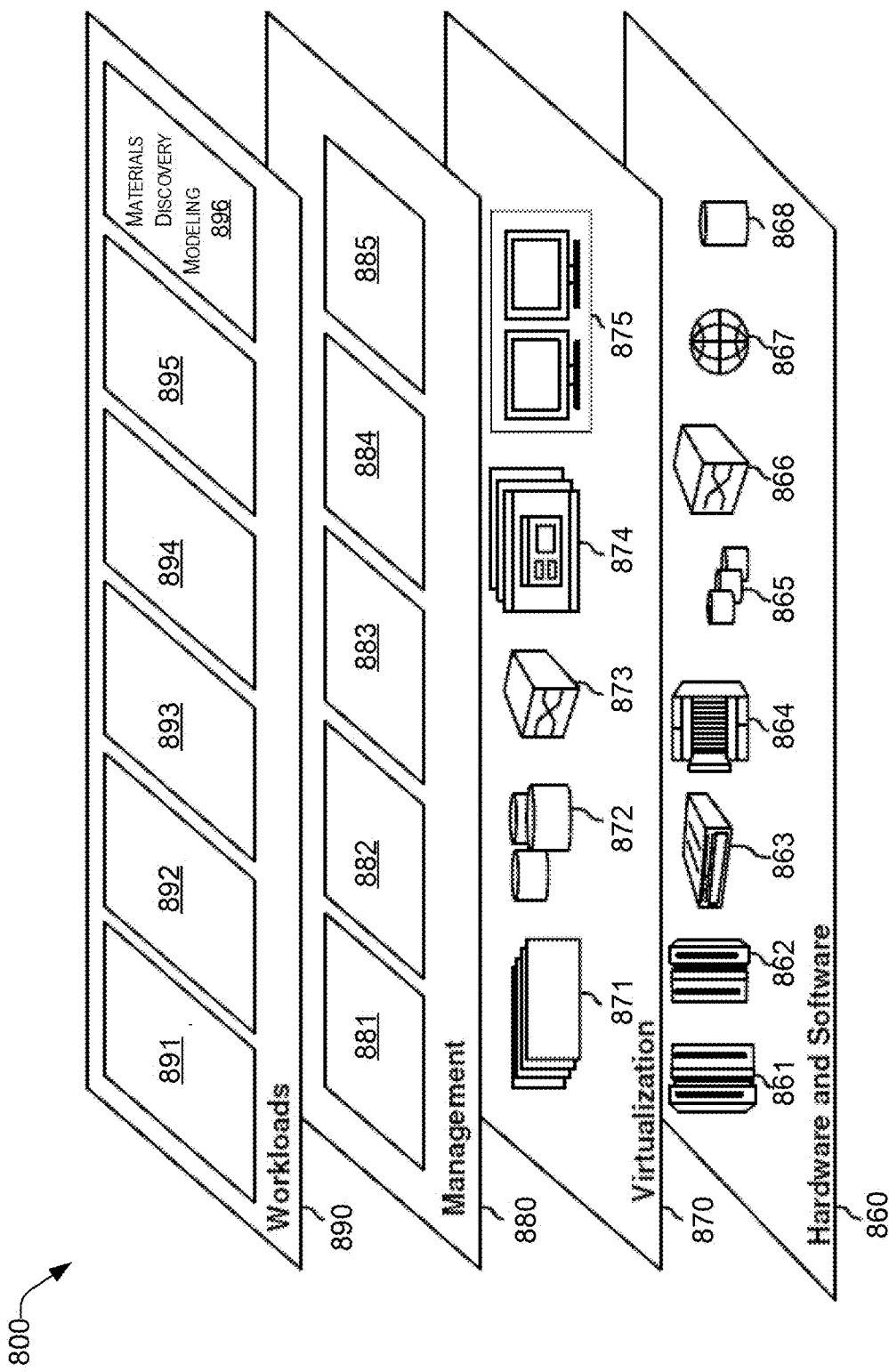
FIG. 8 depicts abstraction model layers, consistent with an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and materials discovery modeling 896, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of discovering materials for use in carbon dioxide separation, the computer-implemented method comprising:

extracting from sources, references to chemical molecules;

encoding the extracted references into one or more chemical formulas;

calculating molecular properties from the one or more chemical formulas;

extracting features from the one or more chemical formulas;

predicting molecular properties of predicted molecular structures related to the carbon dioxide separation, through a machine learning engine, wherein the predicted molecular properties are based on the calculated molecular properties and the extracted features related to the carbon dioxide separation;

defining one or more target properties for the predicted molecular structures for the carbon dioxide separation;

performing by the machine learning engine, an inverse problem feature search using the defined one or more target properties for the carbon dioxide separation;

estimating, by the machine learning engine, feature vector values based on one or more values of the defined one or more target properties;

identifying candidate feature vectors satisfying the inverse problem feature search, from the estimated feature vector values;

generating proposed synthesized molecular structures for the carbon dioxide separation based on the identified candidate feature vectors, wherein the proposed synthesized molecular structures include predicted molecular properties that satisfy the defined one or more target properties;

comparing the proposed synthesized molecular structures and a set of polymer property functionality (PPF) values, wherein the set of PPF values is based on the calculated molecular properties;

detecting, based on the comparing, a match between one of the proposed synthesized molecular structures and the set of PPF values for the carbon dioxide separation; and outputting, based on the detected match, the one of the proposed synthesized molecular structures for validation related to the carbon dioxide separation.

2. The computer-implemented method of claim 1, wherein the defined one or more target properties include a gas permeability, a glass transition temperature, and a temperature associated with a half-life of a candidate synthesized molecule.

3. The computer-implemented method of claim 1, wherein the encoding includes converting the extracted references to the chemical molecules into simplified molecular-input line-entry system (SMILES) string representations.

4. The computer-implemented method of claim 1, further comprising:
applying a rules based filtering criteria to the generated proposed synthesized molecular structures;
comparing the generated proposed synthesized molecular structures to the rules based filtering criteria;
identifying one of the generated proposed synthesized molecular structures as a best match to the rules based filtering criteria; and
validating whether the identified generated proposed synthesized molecular structure is usable in the carbon dioxide separation.

5. The computer-implemented method of claim 1, further comprising:
selecting a generated proposed synthesized molecular structure of the generated proposed synthesized molecular structures; and
performing a molecular dynamics simulation on the selected generated proposed synthesized molecular structure to validate a physical structure of the selected generated proposed synthesized molecular structure.

6. The computer-implemented method of claim 5, wherein the validation of the physical structure of the selected generated proposed synthesized molecular structure is based on a gas permeability and a selectivity of the selected generated proposed synthesized molecular structure for the carbon dioxide separation.

7. A computer program product for discovering materials for use in carbon dioxide separation, the computer program product comprising:
one or more non-transitory computer readable storage media, and program instructions collectively stored on the one or more non-transitory computer readable storage media to perform operations comprising:
extracting from sources, references to chemical molecules;
encoding the extracted references into one or more chemical formulas;
calculating molecular properties from the one or more chemical formulas;
extracting features from the one or more chemical formulas;
predicting molecular properties of predicted molecular structures related to the carbon dioxide separation, through a machine learning engine, wherein the predicted molecular properties are based on the calculated molecular properties and the extracted features related to the carbon dioxide separation;
defining one or more target properties for the predicted molecular structures for the carbon dioxide separation;
performing by the machine learning engine, an inverse problem feature search using the defined one or more target properties for the carbon dioxide separation;
estimating, by the machine learning engine, feature vector values based on one or more values of the defined one or more target properties;
identifying candidate feature vectors satisfying the inverse problem feature search, from the estimated feature vector values;
generating proposed synthesized molecular structures for the carbon dioxide separation based on the identified candidate feature vectors, wherein the proposed synthesized molecular structures include predicted molecular properties that satisfy the defined one or more target properties;
comparing the proposed synthesized molecular structures and a set of polymer property functionality (PPF) values, wherein the set of PPF values is based on the calculated molecular properties;
detecting, based on the comparing, a match between one of the proposed synthesized molecular structures and the set of PPF values for the carbon dioxide separation; and
outputting, based on the detected match, the one of the proposed synthesized molecular structures for validation related to the carbon dioxide separation.

8. The computer program product of claim 7, wherein the defined one or more target properties include a gas permeability, a glass transition temperature, and a temperature associated with a half-life of a candidate synthesized molecule.

9. The computer program product of claim 7, wherein the encoding includes converting the extracted references to the chemical molecules into simplified molecular-input line-entry system (SMILES) string representations.

10. The computer program product of claim 7, wherein the operations further comprise:
applying a rules based filtering criteria to the generated proposed synthesized molecular structures;
comparing the generated proposed synthesized molecular structures to the rules based filtering criteria;
identifying one of the generated proposed synthesized molecular structures as a best match to the rules based filtering criteria; and
validating whether the identified generated proposed synthesized molecular structure is usable in the carbon dioxide separation.

11. The computer program product of claim 7, wherein the operations further comprise:
selecting a generated proposed synthesized molecular structure of the generated proposed synthesized molecular structures; and
performing a molecular dynamics simulation on the selected generated proposed synthesized molecular structure to validate a physical structure of the selected generated proposed synthesized molecular structure.

12. The computer program product of claim 11, wherein the validation of the physical structure of the selected generated proposed synthesized molecular structure is based on a gas permeability and a selectivity of the selected generated proposed synthesized molecular structure for the carbon dioxide separation.

13. A computer server, comprising:
a network connection;
one or more computer readable storage media;
a processor coupled to the network connection and coupled to the one or more computer readable storage media; and
a computer program product comprising program instructions collectively stored on the one or more computer readable storage media to perform operations comprising:
extracting from sources, references to chemical molecules;
encoding the extracted references into one or more chemical formulas;
calculating molecular properties from the one or more chemical formulas;
extracting features from the one or more chemical formulas;
predicting molecular properties of predicted molecular structures related to carbon dioxide separation, through a machine learning engine, wherein the predicted molecular properties are based on the calculated molecular properties and the extracted features related to the carbon dioxide separation;

defining one or more target properties for the predicted for the carbon dioxide separation;

performing by the machine learning engine, an inverse problem feature search using the defined one or more target properties for the carbon dioxide separation;

estimating, by the machine learning engine, feature vector values based on one or more values of the defined one or more target properties;

identifying candidate feature vectors satisfying the inverse problem feature search, from the estimated feature vector values;

generating proposed synthesized molecular structures for the carbon dioxide separation based on the identified candidate feature vectors, wherein the proposed synthesized molecular structures include predicted molecular properties that satisfy the defined one or more target properties;

comparing the proposed synthesized molecular structures and a set of polymer property functionality (PPF) values, wherein the set of PPF values is based on the calculated molecular properties;

detecting, based on the comparing, a match between one of the proposed synthesized molecular structures and the set of PPF values for the carbon dioxide separation; and outputting, based on the detected match, the one of the proposed synthesized molecular structures for validation related to the carbon dioxide separation.

14. The computer server of claim 13, wherein the defined one or more target properties include a gas permeability, a glass transition temperature, and a temperature associated with a half-life of a candidate synthesized molecule.

15. The computer server of claim 13, wherein the operations further comprise:
applying a rules based filtering criteria to the generated proposed synthesized molecular structures;
comparing the generated proposed synthesized molecular structures to the rules based filtering criteria;
identifying one of the generated proposed synthesized molecular structures as a best match to the rules based filtering criteria; and
validating whether the identified generated proposed synthesized molecular structure is usable in the carbon dioxide separation.

16. The computer server of claim 13, wherein the operations further comprise:
selecting a generated proposed synthesized molecular structure of the generated proposed synthesized molecular structures; and
performing a molecular dynamics simulation on the selected generated proposed synthesized molecular structure to validate a physical structure of the selected generated proposed synthesized molecular structure.

17. The computer server of claim 16, wherein the validation of the physical structure of the selected generated proposed synthesized molecular structure is based on a gas permeability and a selectivity of the selected generated proposed synthesized molecular structure for the carbon dioxide separation.

18. The computer-implemented method of claim 1, wherein the generated proposed synthesized molecular structures do not yet exist.

19. The computer-implemented method of claim 1, further comprising:
constructing, by a simulator process, a three-dimensional bulk polymeric membrane based on a selected synthesized molecular structure of the proposed synthesized molecular structures;
constructing, by the simulator process, a slab with predefined membrane thickness based on the selected synthesized molecular structure; and
performing, based on a result of the simulator process, molecular dynamics simulation to validate a permeability and a selectivity of the selected synthesized molecular structure for the carbon dioxide separation.

* * * * *